United States Patent
Miura

(10) Patent No.: US 6,728,797 B2
(45) Date of Patent: Apr. 27, 2004

(54) DMA CONTROLLER

(75) Inventor: Hiroshi Miura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 315 days.

(21) Appl. No.: 09/928,978

(22) Filed: Aug. 14, 2001

(65) Prior Publication Data

US 2002/0026544 A1 Feb. 28, 2002

(30) Foreign Application Priority Data

Aug. 25, 2000 (JP) ........................................ 2000-254749

(51) Int. Cl.$^7$ ............................................... G06F 13/28
(52) U.S. Cl. ............................ 710/22; 710/24; 710/25; 710/28
(58) Field of Search .................................... 710/22–28

(56) References Cited

U.S. PATENT DOCUMENTS

| | | | | |
|---|---|---|---|---|
| 5,430,853 A | * | 7/1995 | Arakawa | 710/22 |
| 5,497,501 A | * | 3/1996 | Kohzono et al. | 710/29 |
| 5,857,114 A | * | 1/1999 | Kim | 710/22 |
| 5,905,911 A | * | 5/1999 | Shimizu | 710/22 |
| 6,115,767 A | * | 9/2000 | Hashimoto et al. | 710/107 |
| 6,249,833 B1 | * | 6/2001 | Takahashi | 710/308 |

* cited by examiner

Primary Examiner—Jeffrey Gaffin
Assistant Examiner—David Martinez
(74) Attorney, Agent, or Firm—Arent Fox, PLLC

(57) ABSTRACT

A DMA controller has a cycle register in which the number of data transfer cycles to be performed in response to a single DMA transfer request is set, a cycle counter for counting the number of data transfer cycles actually performed, and a transfer counter for holding a value that is updated every time the number of data transfer cycles as held in the cycle register are completed. From the start to the end of the data transfer cycles, the number held in the cycle register is kept unchanged, and the data transfer cycles are performed until the value held in the transfer counter becomes equal to a predetermined value. In this configuration, even in a case where a predetermined number of DMA transfer cycles are performed in response to a single DMA transfer request and a plurality of DMA transfer requests are made in succession, the CPU has to set in the DMA controller only once the addresses of the source and destination locations and the values to be held in the cycle register and the transfer counter. This helps alleviate the burden on the CPU and thereby accordingly reduce the lowering of overall system performance.

3 Claims, 5 Drawing Sheets

DMA CONTROLLER

BACKGROUND OF THE INVENTION

1. Field of the Invention

The present invention relates to a DMA controller that controls the transfer of data performed between peripheral devices without the intervention of a central processing unit (hereinafter abbreviated to "CPU").

2. Description of the Prior Art

When a DMA controller receives a request for data transfer from a peripheral device, it requests access to a system bus from a CPU. When the DMA controller is permitted access to the system bus, it starts transferring data from a predetermined source location to a predetermined destination location. As opposed to data transfer controlled by a CPU, in data transfer controlled by a DMA controller (hereinafter referred to as "DMA transfer"), there is no need to read and interpret commands, and this makes fast data transfer possible. A DMA controller has a count register to which a CPU writes the number of data transfer cycles to be performed, so that the DMA controller ends DMA transfer when it has performed as many data transfer cycles as written to the count register.

However, a conventional DMA controller is provided with, for each channel, only one register to which a CPU writes the information on the number of data transfer cycles. Thus, in response to a single request for DMA transfer, either a single cycle or a specified number of cycles of DMA transfer can only be performed. Therefore, in a case where a plurality of DMA transfer cycles are performed in response to a single DMA transfer request, and a plurality of DMA transfer requests are made in succession, every time a DMA transfer request is made, the CPU needs not only to set the DMA controller to perform a specified number of DMA transfer cycles in response to a single DMA transfer request, but also to set in the DMA controller the addresses of the source and destination locations and the number of transfer cycles to be performed. This lowers overall system performance.

SUMMARY OF THE INVENTION

An object of the present invention is to provide a DMA controller that operates with reduced lowering of overall system performance in a case where a predetermined number of DMA transfer cycles are performed in response to a single DMA transfer request and a plurality of DMA transfer requests are made in succession.

To achieve the above object, according to the present invention, a DMA controller is provided with: a cycle register in which the number of data transfer cycles to be performed in response to a single DMA transfer request is set; a cycle counter for counting the number of data transfer cycles actually performed; and a transfer counter for holding a value that is updated every time the number of data transfer cycles as held in the cycle register are completed. Here, from the start to the end of the data transfer cycles, the number held in the cycle register is kept unchanged, and the data transfer cycles are performed until the value held in the transfer counter becomes equal to a predetermined value.

In this configuration, even in a case where a predetermined number of DMA transfer cycles are performed in response to a single DMA transfer request and a plurality of DMA transfer requests are made in succession, the CPU has to set in the DMA controller only once the addresses of the source and destination locations and the values to be held in the cycle register and the transfer counter. Specifically, the value to be held in the cycle register is set according to the number of DMA transfer cycles to be performed in response to a single DMA transfer request, and the value to be held in the transfer counter is set according to the number of DMA transfer requests that are made in succession. In this way, the conditions under which to perform DMA transfer can be set all together. This helps alleviate the burden on the CPU and thereby accordingly reduce the lowering of overall system performance.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
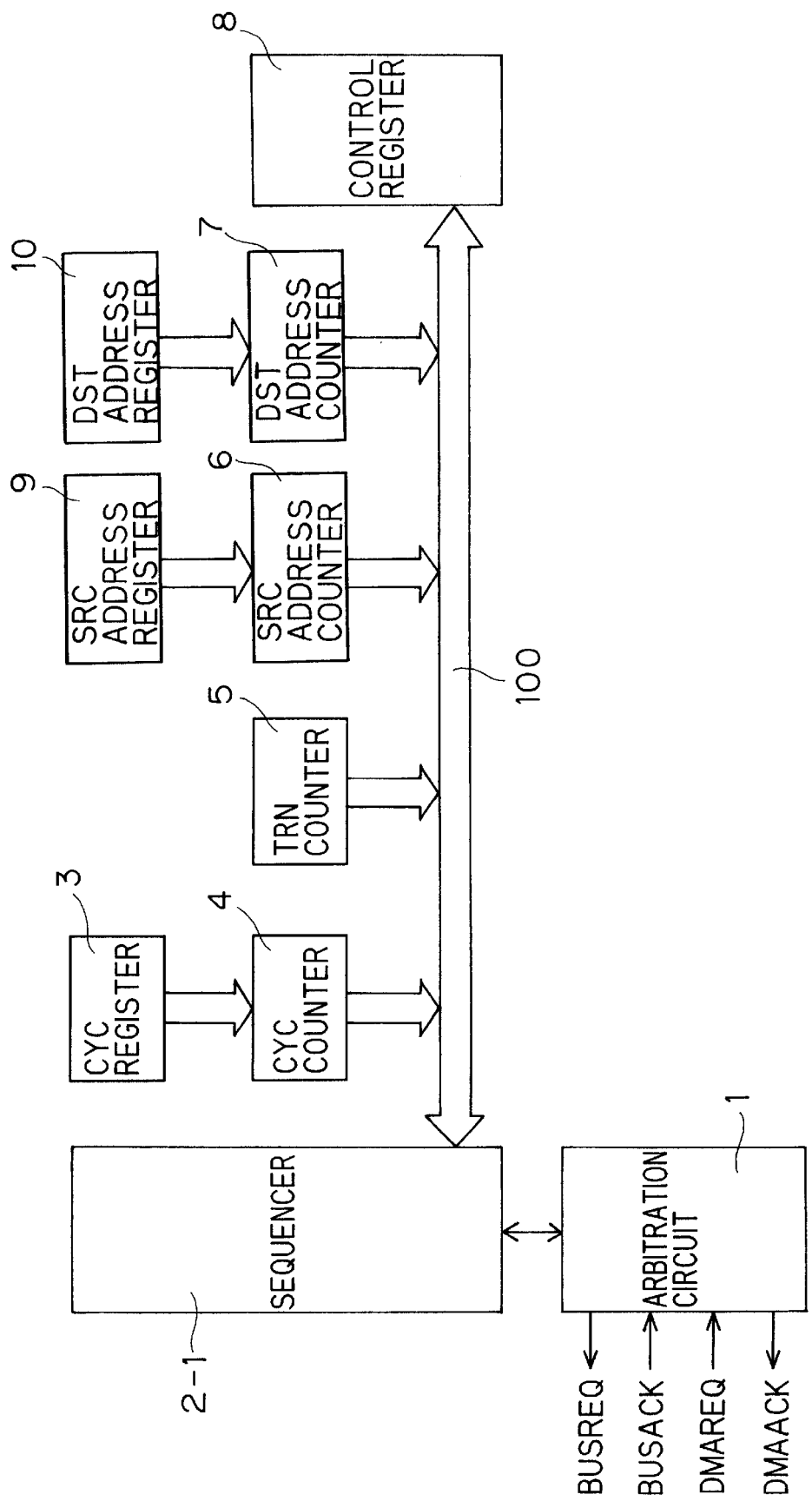
FIG. 1 is a block diagram of the DMA controller of a first embodiment of the invention.

Hereinafter, embodiments of the present invention will be described with reference to the drawings. FIG. 1 is a block diagram of the DMA controller of a first embodiment of the invention. In this figure, reference numeral 1 represents an arbitration circuit, reference numeral 2-1 represents a sequencer, reference numeral 3 represents a CYC register, reference numeral 4 represents a CYC counter, reference numeral 5 represents a TRN counter, reference numeral 6 represents an SRC address counter, reference numeral 7 represents a DST address counter, reference numeral 8 represents a control register, reference numeral 9 represents an SRC address register, and reference numeral 10 represents a DST address register.

The arbitration circuit 1 arbitrates access to a system bus, controls the sequencer 2-1, abandons access to the system bus, and performs other operations. According to instructions given from the arbitration circuit 1, the sequencer 2-1 controls DMA transfer. The sequencer 2-1 can access various registers and counters by way of a bus 100 provided within the DMA controller.

To the CYC register 3, a CPU writes the number of data transfer cycles to be performed in response to a single DMA transfer request. The CYC counter 4 is for counting the number of data transfer cycles that have actually been performed. To the TRN counter 5, the CPU writes the number of DMA transfer requests that are going to be made. In the SRC address counter 6, the address of the data transfer source location is specified. In the DST address counter 7, the address of the data transfer destination location is specified. To the SRC address register 9, the CPU writes the start address of the data transfer source location. To the DST address register 10, the CPU writes the start address of the data transfer destination location. To the control register 8, the CPU writes various items of information on DMA transfer. It is to be noted that, when the CPU has access to the system bus, it can access the registers and counters provided within the DMA controller by way of the system bus.

According to instructions given from the sequencer 2-1, the CYC counter 4, TRN counter 5, SRC address counter 6, and DST address counter 7 update the values held in them. Moreover, as needs arise, under the control of the sequencer 2-1, the values held in the CYC counter 4, SRC address counter 6, and DST address counter 7 are rewritten with the values held in the CYC register 3, SRC address register 9, and DST address register 10, respectively. Moreover, as needs arise, the CPU rewrites the values held in the CYC register 3, TRN counter 5, SRC address register 9, and DST address register 10.

Now, how the arbitration circuit 1 operates will be described specifically. When there is a request for DMA transfer (specifically, when an input signal DMAREQ is asserted), the arbitration circuit 1 requests access to the system bus from the CPU (specifically, it asserts an output signal BUSREQ). When the arbitration circuit 1 is permitted access to the system bus by the CPU (specifically, when an input signal BUSACK is asserted), it issues a DMA transfer start command to the sequencer 2-1 (specifically, it asserts a start signal targeted at the sequencer 2-1), and also asserts an output signal DMAACK.

Moreover, when the arbitration circuit 1 is notified of the end of DMA transfer by the sequencer 2-1, it frees the system bus (specifically, it negates the output signal BUSREQ), and also negates the output signal DMAACK.

Moreover, when the arbitration circuit 1 is notified of the occurrence of an underflow by the sequencer 2-1, it frees the system bus (specifically, it negates the output signal BUSREQ), also negates the output signal DMAACK, and in addition instructs the sequencer 2-1 to wait (specifically, it negates the start signal targeted at the sequencer 2-1).

Figure 2:
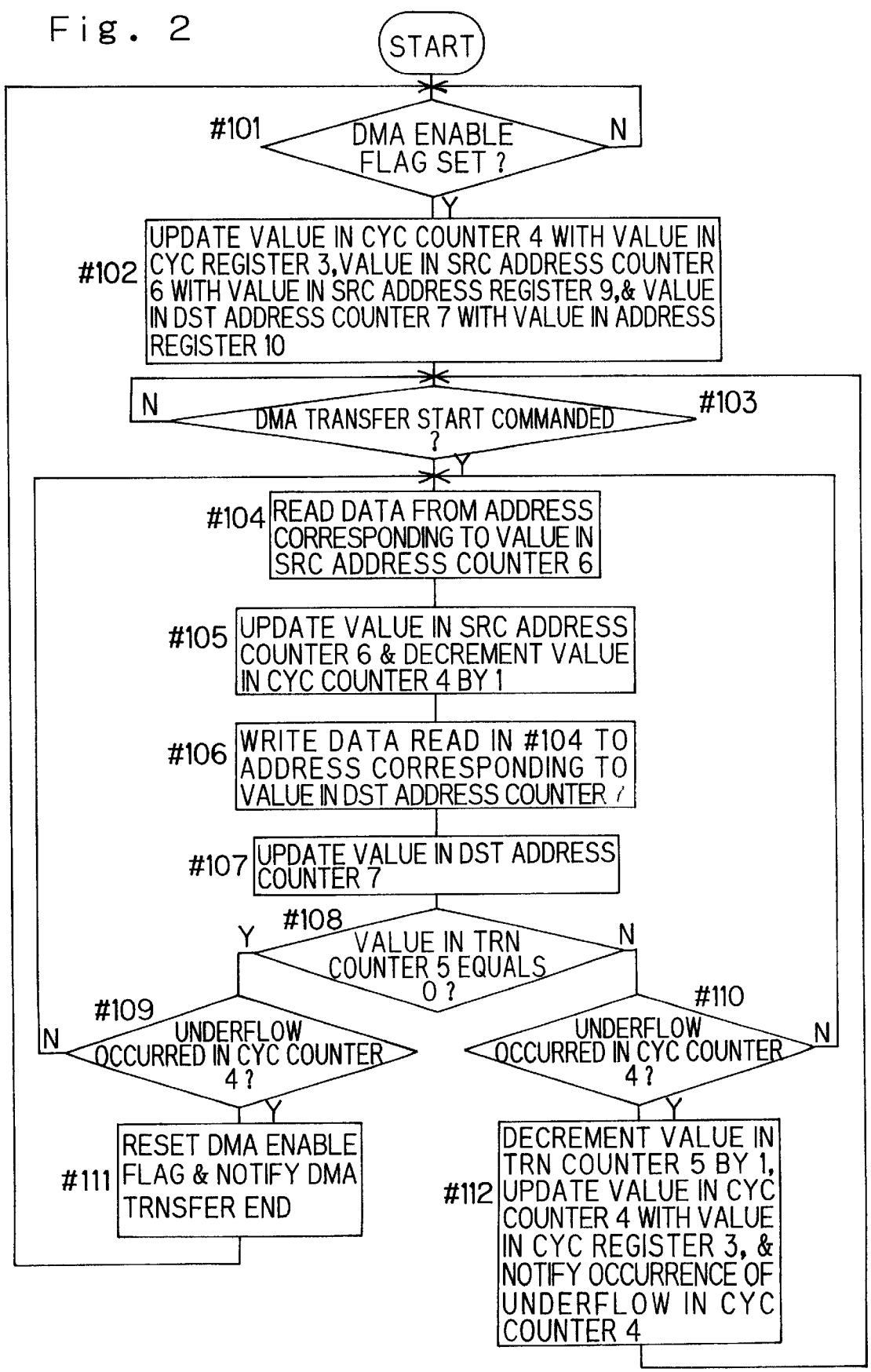
FIG. 2 is a flow chart of an example of the operations performed by the sequencer of the DMA controller of the first embodiment.

Now, an example of how the sequencer 2-1 operates will be described with reference to the flow chart shown in FIG. 2. First, when a DMA enable flag within the control register 8 is set (Y in #101), the value held in the CYC counter 4 is updated with the value held in the CYC register 3, the value held in the SRC address counter 6 is updated with the value held in the SRC address register 9, and the value held in the DST address counter 7 is updated with the value held in the DST address register 10 (#102). Here, the CPU is so configured as to first write the information necessary for DMA transfer to the registers and counters provided within the DMA controller and then set the DMA enable flag (i.e. permit the DMA controller DMA transfer).

Next, when the sequencer 2-1 is instructed to start DMA transfer by the arbitration circuit 1 (i.e. when the start signal is asserted) (Y in #103), it reads into its own buffer the data at the address corresponding to the value held in the SRC address counter 6 (#104). Next, the value held in the SRC address counter 6 is updated, and the value held in the CYC counter 4 is decremented by 1 (#105).

Next, the sequencer 2-1 writes the data read in #104 to the address corresponding to the value held in the DST address counter 7 (#106). Next, the value held in the DST address counter 7 is updated (#107). Next, whether the value held in the TRN counter 5 equals 0 or not is checked (#108).

If, in #108, the value held in the TRN counter 5 is found to equal 0 (Y in #108), the flow proceeds to #109 described later. Otherwise, i.e. if the value held in the TRN counter 5 is found not to equal 0 (N in #108), the flow proceeds to #110 described later. In #109 and #110, whether an underflow has occurred in the CYC counter 4 or not is checked.

If, in #109, an underflow is found to have occurred in the CYC counter 4 (Y in #109), the sequencer 2-1 resets the DMA enable flag within the control register 8, and in addition notifies the arbitration circuit 1 of the end of DMA transfer (#111). On completion of #111, the flow proceeds to #101 described earlier (i.e. the sequencer 2-1 enters into a state waiting for the CPU to permit DMA transfer). Otherwise, i.e. if no underflow is found to have occurred in the CYC counter 4 (N in #109), the flow proceeds to #104 described earlier.

As described earlier, when the arbitration circuit 1 is notified of the end of DMA transfer by the sequencer 2-1, it frees the system bus (specifically, it negates the output signal BUSREQ), and also negates the output signal DMAACK.

If, in #110, an underflow is found to have occurred in the CYC counter 4 (Y in #110), the sequencer 2-1 decrements the value held in the TRN counter 5 by 1, also updates the value held in the CYC counter 4 with the value held in the CYC register 3, and in addition notifies the arbitration circuit 1 of the occurrence of the underflow in the CYC counter 4 (#112). On completion of #112, the flow proceeds to #103 described earlier (i.e. the sequencer 2-1 enters into a state waiting for the arbitration circuit 1 to command the starting of DMA transfer). Otherwise, i.e. if no underflow is found to have occurred in the CYC counter 4 (N in #110), the flow proceeds to #104 described earlier.

As described earlier, when the arbitration circuit 1 is notified of the occurrence of the underflow in the CYC counter 4 by the sequencer 2-1, it frees the system bus (specifically, it negates the output signal BUSREQ), also negates the output signal DMAACK, and in addition instructs the sequencer 2-1 to wait (specifically, it negates the start signal targeted at the sequencer 2-1).

Figure 3:
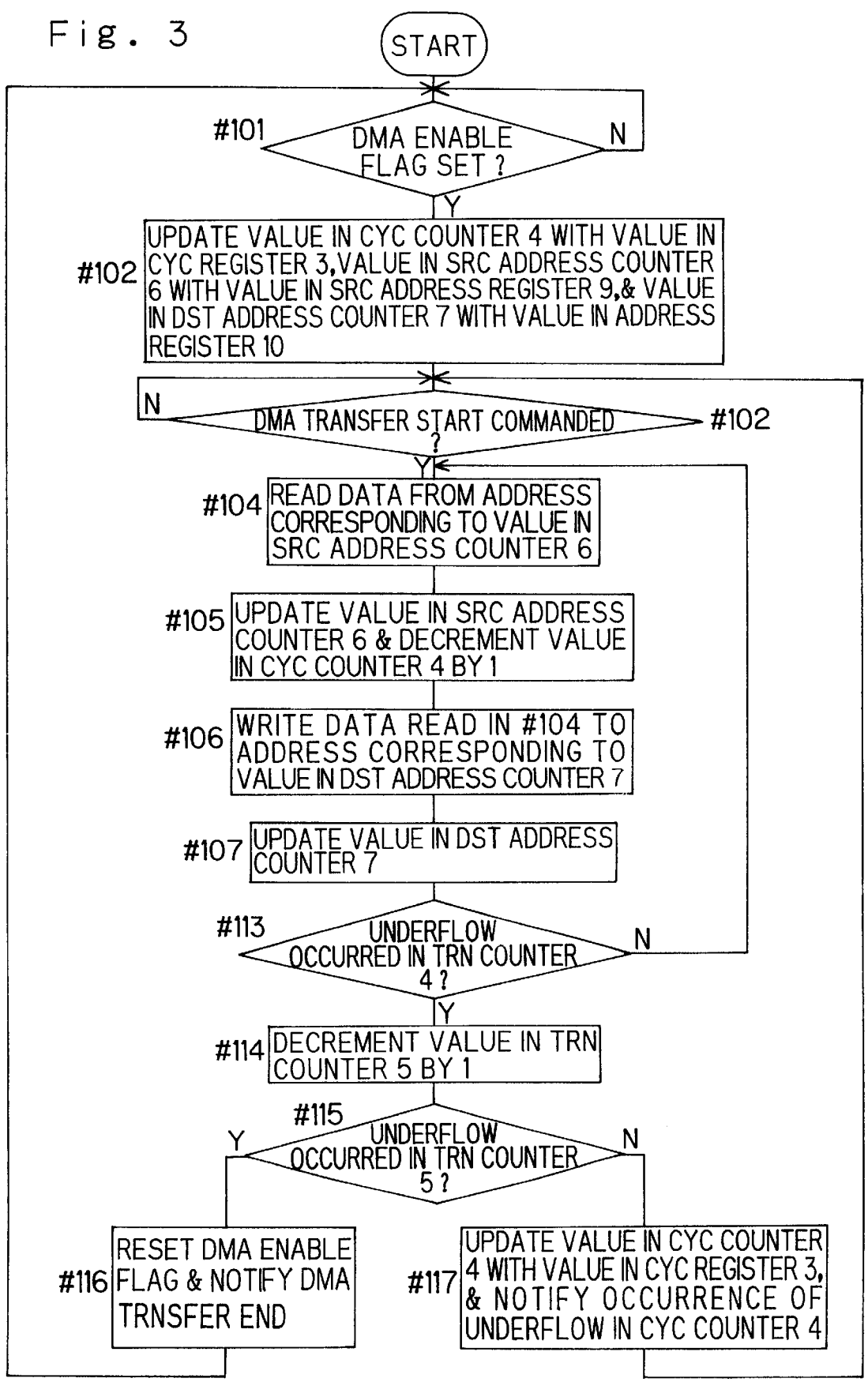
FIG. 3 is a flow chart of another example of the operations performed by the sequencer of the DMA controller of the first embodiment.

Next, another example of how the sequencer 2-1 operates will be described with reference to the flow chart shown in FIG. 3. Here, such steps as are found also in the flow chart shown in FIG. 2 are identified with the same step numbers, and their explanations will not be repeated. On completion of #107 described earlier, whether an underflow has occurred in the CYC counter 4 or not is checked (#113).

If, in #113, an underflow is found to have occurred in the CYC counter 4 (Y in #113), the sequencer 2-1 decrements the value held in the TRN counter 5 by 1 (#114). Otherwise, if no underflow is found to have occurred in the CYC counter 4 (N in #113), the flow proceeds to #104 described earlier.

On completion of #114, whether an underflow has occurred in the TRN counter 5 or not is checked (#115). If, in #115, an underflow is found to have occurred in the TRN counter 5 (Y in #115), the flow proceeds to #116 described later. Otherwise, i.e. if no underflow is found to have occurred in the TRN counter 5 (N in #115), the flow proceeds to #117 described later.

In #116, the sequencer 2-1 resets the DMA enable flag within the control register 8, and in addition notifies the arbitration circuit 1 of the end of DMA transfer. On completion of #116, the flow proceeds to #101 described earlier (i.e. the sequencer 2-1 enters into a state waiting for the CPU to permit DMA transfer).

As described earlier, when the arbitration circuit 1 is notified of the end of DMA transfer by the sequencer 2-1, it frees the system bus (specifically, it negates the output signal BUSREQ), and also negates the output signal DMAACK.

In #117, the sequencer 2-1 updates the value held in the CYC counter 4 with the value held in the CYC register 3, and in addition notifies the arbitration circuit 1 of the occurrence of the underflow in the CYC counter 4. On completion of #117, the flow proceeds to #103 described earlier (i.e. the sequencer 2-1 enters into a state waiting for the arbitration circuit 1 to command the starting of DMA transfer).

As described earlier, when the arbitration circuit 1 is notified of the occurrence of the underflow in the CYC counter 4 by the sequencer 2-1, it frees the system bus (specifically, it negates the output signal BUSREQ), also negates the output signal DMAACK, and in addition instructs the sequencer 2-1 to wait (specifically, it negates the start signal targeted at the sequencer 2-1).

Through the operations described above, in this first embodiment, if it is assumed that the value set in the CYC register 3 is x and that the value set in the TRN counter 5 is y, x+1 DMA transfer cycles are performed in response to a single DMA transfer request, and thereafter the DMA controller remains in a stand-by state until a new request for DMA transfer occurs. Eventually, when a due number of DMA transfer cycles have been performed in response to y+1 DMA transfer requests, the DMA controller ends its operation; that is, it performs (x+1)×(y+1) DMA transfer cycles in total.

Thus, in a case where A DMA transfer cycles are performed in response to a single DMA transfer request and in addition B DMA transfer requests are made in succession (i.e. A×B DMA transfer cycles are performed in total), it is only once that the CPU needs to set appropriate addresses in the SRC address register 9 and the DST address register 10 and set the values held in the CYC register 3 and the TRN counter 5 respectively to A−1 and B−1. This helps alleviate the burden on the CPU and thereby accordingly reduce the lowering of overall system performance.

In the operation of the sequencer 2-1 described above, the step of updating the value held in the SRC address counter 6 and the step of decrementing the value held in the CYC counter 4 by 1 may be performed after the writing of the data; that is, the order of #105 and #106 may be reversed. Alternatively, #105 may be performed after #107.

Figure 4:
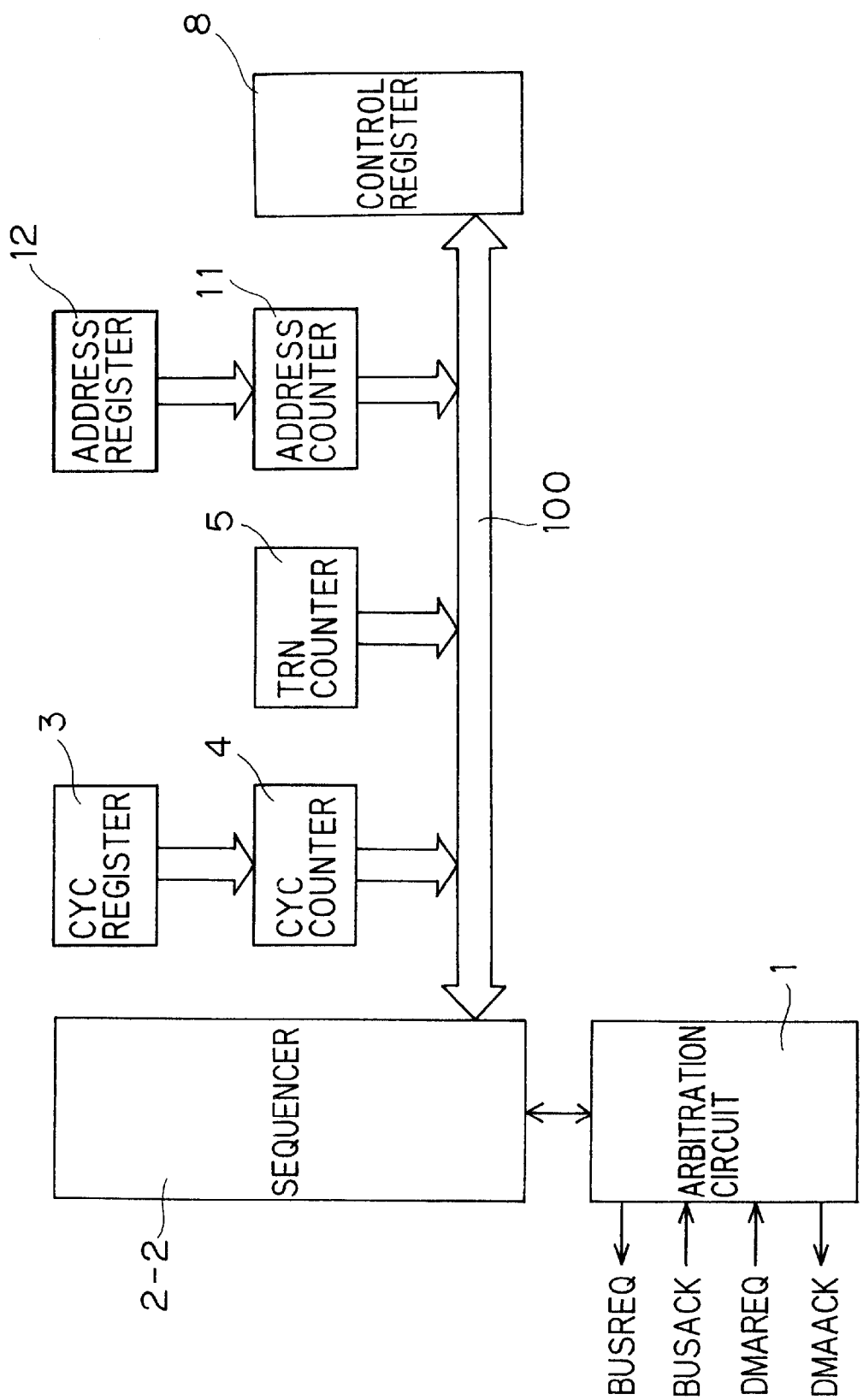
FIG. 4 is a block diagram of the DMA controller of a second embodiment of the invention.

FIG. 4 shows a block diagram of the DMA controller of a second embodiment of the invention. The DMA controller of the second embodiment is designed to cope with cases where the address of the source location or of the destination location is single and fixed. In this figure, reference numeral 2—2 represents a sequencer, reference numeral 11 represents an address counter, and reference numeral 12 represents an address register. Here, such circuit blocks as are found also in the DMA controller of the first embodiment shown in FIG. 1 and described earlier are identified with the same reference numerals, and their explanations will not be repeated.

According to instructions given from the arbitration circuit 1, the sequencer 2—2 controls DMA transfer. The sequencer 2—2 can access various registers and counters by way of a bus 100 provided within the DMA controller. According to instructions from the sequencer 2—2, the CYC counter 4, TRN counter 5, and address counter 11 update the values held in them. Moreover, as needs arise, under the control of the sequencer 2—2, the values held in the CYC counter 4 and address counter 11 are rewritten with the values held in the CYC register 3 and address register 12. Moreover, as needs arise, the CPU rewrites the value held in the address register 12.

Figure 5:
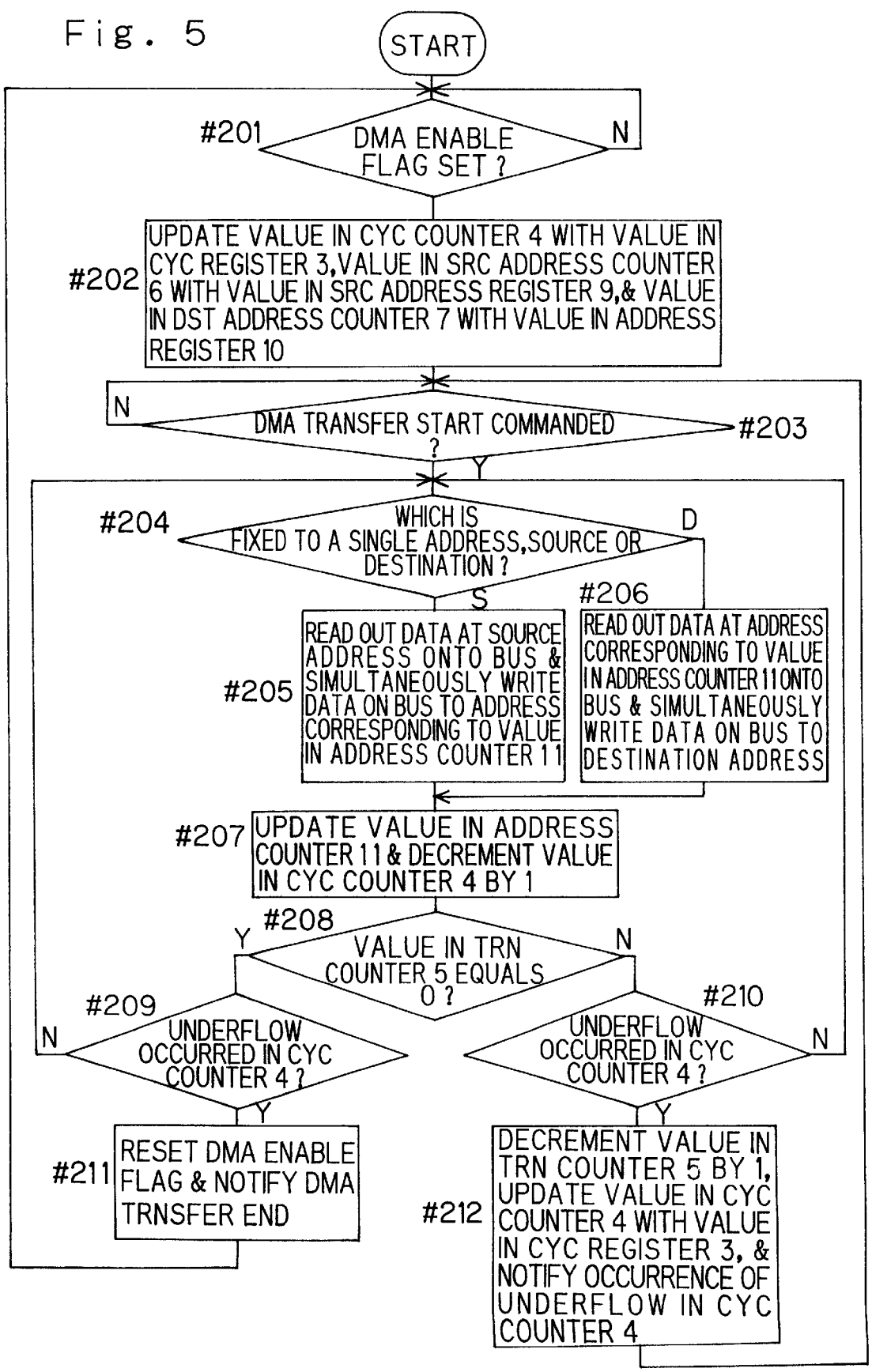
FIG. 5 is a flow chart of an example of the operations performed by the sequencer of the DMA controller of the second embodiment.

Now, how the sequencer 2—2 operates will be described with reference to the flow chart shown in FIG. 5. First, if the DMA enable flag within the control register 8 is set (Y in #201), the value held in the CYC counter 4 is updated by the value held in the CYC register 3, and the value held in the address counter 11 is updated with the value held in the address register 12 (#202).

Next, when the sequencer 2—2 is instructed to start DMA transfer by the arbitration circuit 1 (Y in #203), it refers to the control register 8 to recognize which of the source location address and the destination location address is fixed to a single address (#204).

Next, if the source location address is found to be fixed (S in #204), the data at the source location address is read out onto the bus, and simultaneously the data on the bus is written to the address corresponding to the value held in the address counter 11 (#205). On completion of #205, the flow proceeds to #207 described later. It is to be noted that, when the source location address is found to be fixed, the data at the source location address is read out onto the bus as a result of the arbitration circuit 1 asserting the output signal DMAACK.

On the other hand, if the destination location address is found to be fixed (D in #204), the data at the address corresponding to the value held in the address counter 11 is read out onto the bus, and simultaneously the data on the bus is written to the destination location address (#206). On completion of #206, the flow proceeds to #207 described later. It is to be noted that, when the destination location address is found to be fixed, the data on the bus is written to the destination location address as a result of the arbitration circuit 1 asserting the output signal DMAACK.

In #207, the value held in the CYC counter 4 is decremented by 1, and in addition the value held in the address counter 11 is updated. On completion of #207, whether the value held in the TRN counter 5 equals 0 or not is checked (#208). If the value held in the TRN counter 5 is found to equal 0 (Y in #208), the flow proceeds to #209 described later. Otherwise, i.e. if the value held in the TRN counter 5 is found not to equal 0 (N in #208), the flow proceeds to #210 described later. In #209 and #210, whether an underflow has occurred in the CYC counter 4 or not is checked.

If, in #209, an underflow is found to have occurred in the CYC counter 4 (Y in #209), the sequencer 2-1 resets the DMA enable flag within the control register 8, and in addition notifies the arbitration circuit 1 of the end of DMA transfer (#211). On completion of #211, the flow proceeds to #201 described earlier (i.e. the sequencer 2-1 enters into a state waiting for the CPU to permit DMA transfer). Otherwise, i.e. if no underflow is found to have occurred in the CYC counter 4 (N in #209), the flow proceeds to #204 described earlier.

As described earlier, when the arbitration circuit 1 is notified of the end of DMA transfer by the sequencer 2—2, it frees the system bus (specifically, it negates the output signal BUSREQ), and also negates the output signal DMAACK.

If, in #210, an underflow is found to have occurred in the CYC counter 4 (Y in #210), the sequencer 2-1 decrements the value held in the TRN counter 5 by 1, also updates the value held in the CYC counter 4 with the value held in the CYC register 3, and in addition notifies the arbitration circuit 1 of the occurrence of the underflow in the CYC counter 4 (#212). On completion of #212, the flow proceeds to #203 described earlier (i.e. the sequencer 2-1 enters into a state waiting for the arbitration circuit 1 to command the starting of DMA transfer). Otherwise, i.e. if no underflow is found to have occurred in the CYC counter 4 (N in #210), the flow proceeds to #204 described earlier.

As described earlier, when the arbitration circuit 1 is notified of the occurrence of the underflow in the CYC counter 4 by the sequencer 2—2, it frees the system bus (specifically, it negates the output signal BUSREQ), also negates the output signal DMAACK, and in addition instructs the sequencer 2—2 to wait (specifically, it negates the start signal targeted at the sequencer 2—2).

Through the operations described above, in this second embodiment, it is possible to achieve the same effect as achieved in the first embodiment described earlier, and in addition to reduce the number of registers and counters needed, although the second embodiment is applicably only in cases where data transfer is possible either from a fixed particular source location address or to a fixed particular destination location address.

It is possible to omit the SRC address register 9 and the DST address register 10 in the first embodiment and the address register 12 in the second embodiment by making the CPU write data directly to the SRC address counter 6, the DST address counter 7, and the address counter 11, respectively.

In the embodiments described above, the number of DMA transfer requests that are going to be made is written directly to the TRN counter 5 by the CPU. However, it is also possible, instead, to provide a TRN register so that the number of DMA transfer requests that are going to be made is written to this TRN register by the CPU and that the value held in the TRN counter 5 is updated with the value held in the TRN register at the time point when DMA transfer is permitted. This eliminates the need for the CPU to set repeatedly the number of DMA transfer requests that are going to be made in the DMA controller as long as the same number of DMA transfer requests are made repeatedly.

What is claimed is:

1. A DMA controller comprising:
    a cycle register to which a number of data transfer cycles to be performed in response to a single DMA transfer request is written;
    a cycle counter for counting a number of data transfer cycles actually performed;
    a transfer counter to which a number of DMA transfer requests made is written;
    an arbitration circuit that, on receiving a DMA transfer request, requests access to an external system bus and that, if permitted access to the external system bus, issues a DMA transfer start command; and
    a sequencer that controls DMA transfer according to instructions from the arbitration circuit,
    wherein
        when the sequencer is permitted DMA transfer while the sequencer is in a state waiting for a DMA transfer permission, the sequencer updates the value held in the cycle counter with the value held in the cycle register and then enters into a state waiting for a DMA transfer start command,
        when a DMA transfer start command is issued while the sequencer is in the state waiting for a DMA transfer start command, the sequencer starts data transfer,
        thereafter the sequencer continues data transfer, while updating the value held in the cycle counter every time a data transfer cycle is performed, until the cycle counter enters into a predetermined state, and
        when the cycle counter enters into the predetermined state, the sequencer updates the value held in the transfer counter so that, as a result
            if the transfer counter enters into a predetermined state, the sequencer enters into the state waiting for a DMA transfer permission and,
            if the transfer counter does not enter into the predetermined state, the sequencer updates the value held in the cycle counter with the value held in the cycle register and enters into the state waiting for a DMA transfer start command.

2. A DMA controller as claimed in claim 1, further comprising:
    a source location address counter and a destination location address counter,
    wherein the sequencer performs data transfer from an address corresponding to a value held in the source location address counter to an address corresponding to a value held in the destination location address counter, and updates the values held in the source location address counter and in the destination location address counter every time a data transfer cycle is performed.

3. A DMA controller as claimed in claim 2, further comprising:
    a source location address register to which a start address of a source location from which to transfer data is written and a destination location address register to which a start address of a destination location to which to transfer data is written,
    wherein, when the sequence is permitted DMA transfer while the sequencer is in the state waiting for a DMA transfer permission, the sequencer updates the value held in he source location address counter with the value held in the source location address register and updates the value held in the destination location address counter with the value held in the destination location address register.

* * * * *